United States Patent [19]

Anglin

[11] 4,258,305
[45] Mar. 24, 1981

[54] EMERGENCY BATTERY CHARGER DEVICE

[76] Inventor: Russell E. Anglin, 6157 Cottle Rd., San Jose, Calif. 95123

[21] Appl. No.: 13,265

[22] Filed: Feb. 21, 1979

[51] Int. Cl.³ .............................................. H02J 7/00
[52] U.S. Cl. .................................... 320/2; 307/10 R; 339/29 B
[58] Field of Search ........................................ 320/2–4, 320/25, 26; 339/10 R, 29 R, 29 B; 307/10 R, 10 LS

[56] References Cited

U.S. PATENT DOCUMENTS

| | | | |
|---|---|---|---|
| 3,466,453 | 9/1969 | Greenberg | 320/25 X |
| 3,967,133 | 6/1976 | Bokern | 320/2 X |
| 4,092,580 | 5/1978 | Prinze | 320/2 |
| 4,109,193 | 8/1978 | Schultheis | 320/2 |

Primary Examiner—Robert J. Hickey
Attorney, Agent, or Firm—Paul L. Hickman

[57] ABSTRACT

An emergency battery charger device is disclosed which, in its simplest form, includes a pair of cigarette lighter plugs having their negative contacts coupled together by a conductor and having their positive contacts coupled together by means of a current limiting device such as an incandescent bulb. In use, one of the plugs is plugged into the cigarette lighter socket of a vehicle having a discharged battery and the other plug is plugged into the cigarette lighter socket of a vehicle having a fully charged battery. Current will flow from the good battery and from the good battery's charging system to the bad battery through the incandescent light bulb so as to trickle charge the bad battery. The incandescent bulb serves the dual function of limiting the charging current and acting as a charging rate indicator. A shorting sleeve is also disclosed for shorting the contacts of one of the plugs so that the incandescent bulb can also be used as an emergency light.

5 Claims, 6 Drawing Figures

EMERGENCY BATTERY CHARGER DEVICE

BACKGROUND OF THE INVENTION

1. Field of the Invention

This invention relates generally to battery chargers and more particularly to devices for charging the storage battery of a motorized vehicle.

2. Description of the Prior Art

It is not uncommon for a motorized vehicle's storage battery to become accidently discharged from time to time. It may happen because the vehicle's operator neglected to turn off a current drain, such as the vehicle's headlights, or it may happen simply because the battery was in a weakened condition because the vehicle was not started for a long period of time.

A device for revitalizing a discharged battery is a battery charger having an input for connection to an A.C. power source and having a pair of output leads for attachment to the terminals of the discharged battery. In operation, current flows from the battery charger through the battery until the battery is sufficiently charged to perform its duties. Problems with battery chargers of this type include that the chargers are relatively expensive, that the chargers are slow, and that a nearby A.C. power source is required.

One way of starting the motor of a vehicle with a discharged battery is to use jumper cables to connect the battery to a fully charged battery of another vehicle. The connection of two batteries by jumper cables does not charge the discharged battery, per se, but allows the motor of the vehicle with the discharged battery to start so that the vehicle's own electrical generation system can recharge the battery.

A major problem with jumper cables is that they may cause the battery to explode should the batteries be carelessly or improperly coupled together. Other problems include the mess involved with opening the hood of the vehicle, manipulating the long, bulky and often greasy jumper cables and the problem of storing the cables. In fact, many people do not even carry jumper cables with them because they are so large and bulky, and thus do not have a pair of jumper cables available when an emergency arises.

SUMMARY OF THE INVENTION

It is an object of this invention to provide an emergency battery charger which is compact and light weight and that can be easily and unobtrusively stored within a small space, such as the glove compartment of a motorized vehicle.

Another object of this invention is to provide such a charger which has certain safety advantages over chargers and jumper cables of the prior art in that it need not be connected directly to the battery, thus eliminating the possibility of battery explosion or exposure to battery acids.

It is a further object of this invention to provide an emergency charger with an indicator device for indicating the rate of charge of the discharged battery.

Yet another object of this invention is to provide an emergency battery charger which, with the aid of a suitable adapter, can double as an emergency trouble light.

Briefly, the invention includes a first plug engageable with the cigarette lighter socket of a vehicle having a discharged battery, a second plug engageable with the cigarette lighter socket of a vehicle having a fully charged battery, a conductor connecting the grounded terminal of the two plugs together, and a current limiter device coupling the positive contacts of the two plugs together. When the plugs are inserted into the cigarette lighter sockets of the two vehicles, a current will flow from the charged battery to the discharged battery. The maximum current is determined by the current limiting device, which preferably is an incandescent light bulb, so that the cigarette lighter sockets are not overloaded. The incandescent light further doubles as a charging rate indicator, since it is brightly illuminated when a heavy initial current is flowing from the charged battery to the discharged battery and is only dimly illuminated when a very small current is flowing between the batteries.

Also a part of this invention is an adapter that can be coupled to one of the plugs so that the incandescent light of the device can be used as an emergency light source. A flasher may also be included in the adapter so that the light can become a flashing distress signal.

An advantage of this invention is that it is compact and light weight.

Another advantage of this invention is that the hood of the vehicle need not be opened to use the battery charger, avoiding the mess that often accompanies such an action.

A further advantage of this invention is that the electrical connection to the storage batteries of the vehicle is remote from the batteries themselves, thus eliminating the possibility of battery explosion or accidental exposure to battery acids.

A still further advantage of this invention is that the incandescent bulb has the dual function of limiting the charging current and acting as a charging rate indicator.

Yet another advantage of this invention is that the emergency battery charger can be used, with the aid of an optional or built-in adapter, as an emergency trouble light.

These and other objects and advantages of the present invention will no doubt become apparent upon a reading of the following detailed description as accompanied by the several figures of the drawing.

DETAILED DESCRIPTION OF THE PREFERRED EMBODIMENTS

Figure 1:
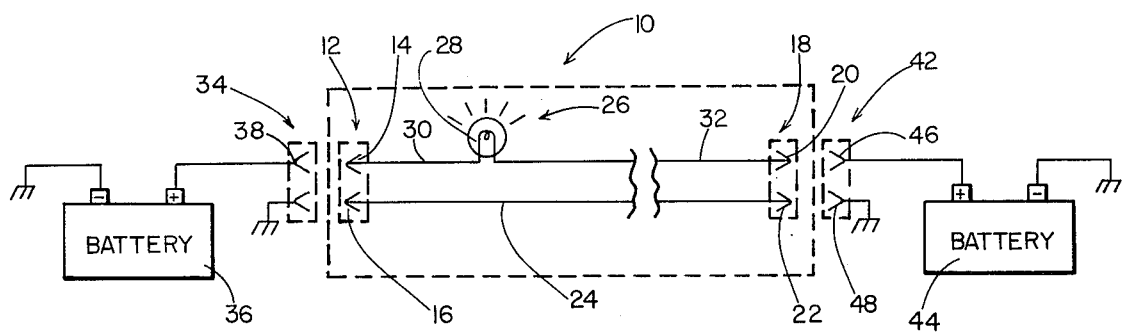
FIG. 1 is a schematic diagram of an emergency battery charger in accordance with the present invention.

In FIG. 1, an emergency battery charger 10 is shown to include a first plug 12 having a positive contact 14 and a negative contact 16, a second plug 18 having a positive contact 20 and a negative contact 22, a conductor 24 coupling negative contact 16 and negative contact 22 together, and a current limiting device 26 including an incandescent bulb 28 coupled between positive contacts 14 and 20 by a pair of conductors 30 and 32. As indicated in the schematic, conductor 32 is generally considerably longer than conductor 30 so that bulb 28 is positioned closer to first plug 12 than second plug 18.

First plug 12 is adapted to engage the cigarette lighter socket 34 of a vehicle having a discharged battery 36. It is standard, in most vehicles, for the positive contact 38 to be connected directly to the positive terminal of the battery and for the negative contact 40 to be grounded to the vehicle's chassis.

Second plug 18 is adapted to engage a second cigarette lighter socket 42 of a second vehicle having a charged battery 44. Positive contact 46 of the second cigarette lighter socket is coupled directly to the positive terminal of battery 44 while the negative contact 48 is coupled to ground.

In use, plug 12 is inserted into socket 34 and plug 18 is inserted into socket 42 thereby coupling the batteries of the two vehicles together. Current from charged battery 44 flows through contact 46, conductor 32, bulb 28, conductor 30, and contact 38 to discharged battery 36. Preferably, the engine of the second vehicle is running so that its electrical generation system is constantly recharging battery 44.

The charging current is limited by the internal resistance of incandescent bulb 28. If, for example a 100-watt, 12-volt bulb were used, a maximum charging current of about 8 amperes could flow from battery 44 to battery 36. The cigarette lighter sockets and the wire connecting those sockets to the battery are capable of carrying considerably more than this amount of current with absolute safety.

The brightness with which bulb 28 burns is an indication of the amount of current flowing from battery 44 to battery 36 and thus is a reliable indicator of the charging rate. When battery 36 is almost completely discharged, bulb 28 will be very brightly illuminated. When battery 36 is almost completely recharged by this device, bulb 28 will be illuminated only dimly or not at all.

When used as described above, charger 10 acts as an emergency "trickle" charger to recharge the discharged battery 36 with a small, "trickle" current. The period of time required for a completely discharged battery to become recharged sufficiently to start most cars is approximately 15 or 20 minutes.

Figure 2:
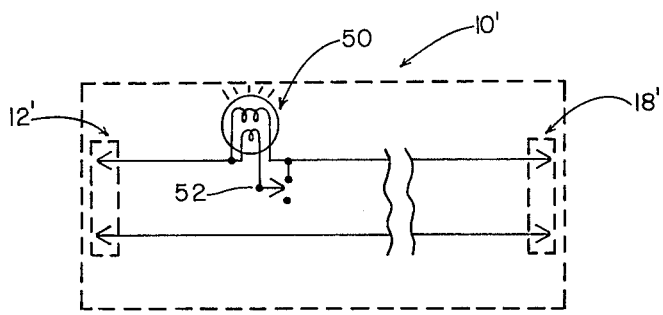
FIG. 2 is a schematic diagram illustrating an alternate embodiment of an emergency battery charger.

In FIG. 2, alternate embodiment of a charger 10' is shown. In this embodiment a 2-filament bulb 50 is coupled between a first plug 12' and a second plug 18'. A switch 52 allows the two filaments to be selectively powered so that two different charging rates can be attained. For example, if two 50-watt filaments were enclosed within the glass envelope of bulb 50, switch 52 could select between energizing both filaments for an 8-ampere maximum charging current or only one element for a 4-ampere maximum charging current. Furthermore, the selection of bulb filaments allows selection of bulb brightness when the emergency battery charger is used as an emergency trouble light, as will be discussed with reference to FIG. 3.

Figure 3:
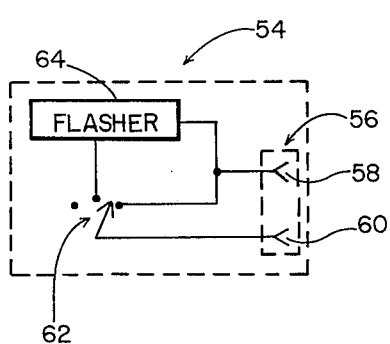
FIG. 3 is a schematic diagram of an adapter unit of the emergency battery charger.

In FIG. 3, an adapter 54 is shown which allows the battery charger to be used as an emergency trouble light. This embodiment of the adapter includes a socket 56 having a pair of contacts 58 and 60 for engagement with the contacts of either plug 12 or plug 18. Contact 60 is connected to the arm of a switch 62 which selectively couples contact 60 either directly to contact 58, to contact 58 through a flasher 64, or uncouples contacts 58 and 60 from one another.

Figure 4:
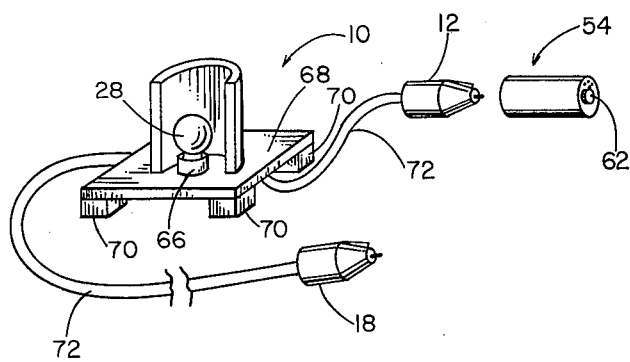
FIG. 4 is a perspective view of a physical configuration of the battery charger shown in FIG. 1.

In FIG. 4, one possible physical configuration for battery charger 10 and an adapter 54 is shown. In this configuration, bulb 28 is screwed into a socket 66 mounted on a support base 68 having a number of resilient feet 70. Plugs 12 and 18 are coupled together as previously described by a pair of elongated cables 72 which include the previously mentioned conductors 24, 30, and 32. Preferably, cable 72 is formed from electrical extension cord (sometimes called "zip cord") having a wire gauge size of 14 or 16. Also preferably, the length of cord attaching plug 12 to the base is about three feet long and the length of cable 72 attaching plug 18 to the base is about fifteen feet long. This provides an extension between two cars in excess of eighteen feet which allows considerable flexibility in the parking relationship between the two vehicles.

Adapter 54 is shown, in FIG. 4, to be ready for engagement with plug 12. When it is engaged with the plug, switch 62 can select one of three trouble light functions, as previously described. Of course, an adapter 54 could simply comprise a shorting sleeve formed of some conductive material which could couple contacts 14 and 16 together. Also, adapter 54 could conceivably be placed over plug 18 to provide a light with a considerably shorter cord.

Figure 5:
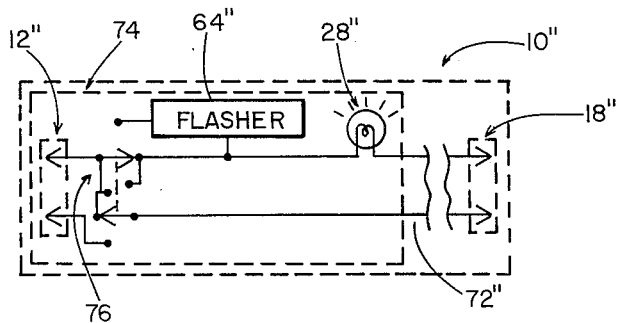
FIG. 5 is a schematic diagram of another alternate embodiment for an emergency battery charger.

In FIG. 5 another alternate embodiment 10" of a battery charger is shown. In this embodiment, many of the components of the previous embodiments are integrated into a common enclosure 74. Housed within or formed as part of the enclosure is plug 12", an incandescent bulb 28", a flasher unit 64", and a double-pole triple-throw switch 76. The switch selects between three modes of operation including charging, steady emergency light operation, and flashing emergency light operation. A plug 18" is remotely connected to the common enclosure 74 by means of a cable 72".

Figure 6:
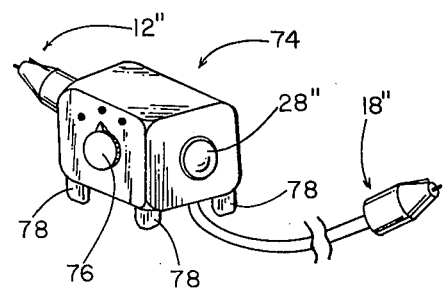
FIG. 6 is a perspective view of a preferred housing for the circuit shown in FIG. 5.

Referring lastly to FIG. 6 a preferred physical structure for this last embodiment is shown. In this figure, enclosure 74 is an elongated box-like structure having safely rounded corners where plug 12" is formed as a part of the enclosure and extends from a rear portion thereof. Switch 76 is attached through a side of the enclosure as shown. Bulb 28" extends through an aperture formed in the end of the enclosure so as to viewable as a charging rate indicator or a trouble light. Feet 78 are provided so the enclosure can be securely set down upon a convenient surface when the battery charger is being used as an emergency light.

While this invention has been described with reference to a few preferred embodiments, it is contemplated that various alterations and modifications thereof will become apparent to those skilled in the art upon a reading of the preceding detailed description. It is therefore intended that the following appended claims be interpreted as including all such alterations and modifications as fall within the true spirit and scope of this invention.

What is claimed is:

1. An emergency battery charger device comprising first plug means engageable with the cigarette lighter socket of a first vehicle, said first plug means having a first negative contact and a first positive contact, second plug means engageable with the cigarette lighter socket of a second vehicle, said second plug means having a second negative contact and a second positive contact, said first negative contact and said second negative contact defining a negative contact pair and said first positive contact and said second positive contact defining a positive contact pair, coupling means coupling one of said negative contact pair and said positive contact pair together, current limiter means including a light emitting device coupling the other one of said negative contact pair and said positive contact pair together, where said first plug means forms a portion of a housing for said light emitting device.

2. An emergency battery charger device comprising first plug means engageable with the cigarette lighter socket of a first vehicle, said first plug means having a first negative contact and a first positive contact, second plug means engageable with the cigarette lighter socket of a second vehicle, said second plug means having a second negative contact and a second positive contact, said first negative contact and said second negative defining a negative contact pair and said first positive contact and said second positive contact defining a positive contact pair, coupling means coupling one of said negative contact pair and said positive contact pair together, and current limiter means coupling the other one of said negative contact pair and said positive contact pair together, said current limiter means including an incandescent light bulb having two independent filaments and a switch means for selectively powering said filaments.

3. An emergency battery charger device comprising first plug means engageable with the cigarette ligher socket of a first vehicle, said first plug means having a first negative contact and a first positive contact, second plug means engageable with the cigarette lighter socket of a second vehicle, said second plug means having a second negative contact and a second positive contact, said first negative contact and said second negative contact defining a negative contact pair and said first positive contact and said second positive contact defining a positive contact pair, coupling means coupling one of said negative contact pair and said positive contact pair together, current limiter means coupling the other one of said negative contact pair and said positive contact pair together, said current limiter means including a light emitting device, and adapter means having a third negative contact and a third positive contact, said adapter means being engageable with said first plug means so that said first negative contact is in contact with said third negative contact and said first positive contact is in contact with said third positive contact, said adapter means also including second coupling means for coupling said third negative contact and said third positive contact together.

4. A charger device as recited in claim 3 wherein said second coupling means includes a second switch means for selectively coupling and uncoupling said third negative contact and said third positive contact.

5. A charger device as recited in claim 3 wherein said second coupling means include flasher means coupled between said third negative contact and said third positive contact.

* * * * *